July 12, 1949.       R. O. WILLIAMS ET AL       2,475,766
ARTIFICIAL FUEL MADE FROM PAPER
Filed April 30, 1946
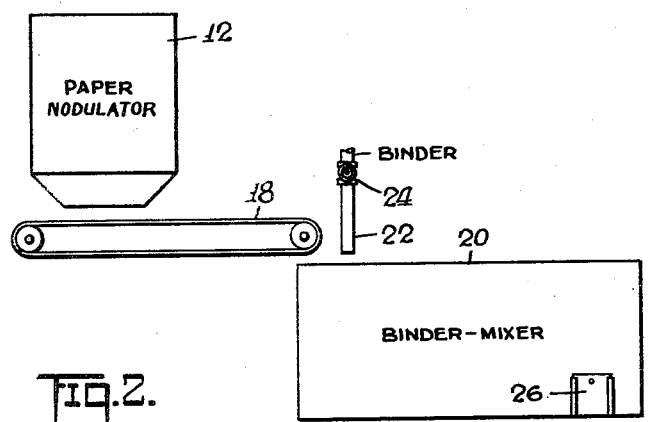
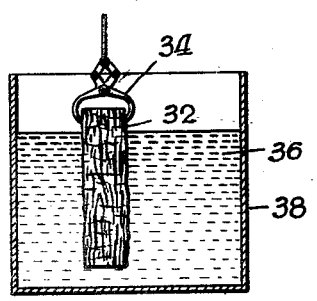
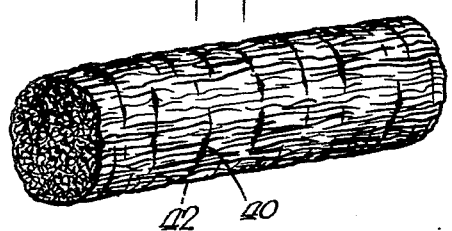
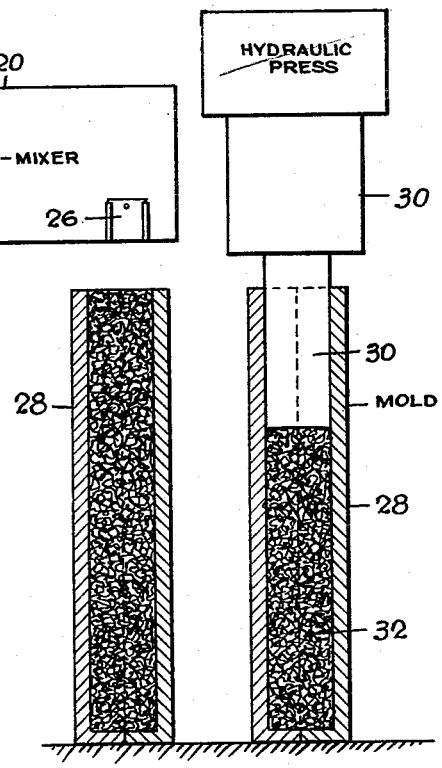
INVENTOR
Ralph O. Williams
Vladimir Bredlik
BY
Richard J. Cowling
ATTORNEY Patented July 12, 1949

2,475,766

UNITED STATES PATENT OFFICE 2,475,766

ARTIFICIAL FUEL MADE FROM PAPER

Ralph O. Williams, Brooklyn, and Vladimir Bredlik, New York, N. Y., assignors to Williams-Bauer Corporation, New York, N. Y., a corporation of New York Application April 30, 1946, Serial No. 666,051

5 Claims. (Cl. 44—14)

The present invention relates to the manufacture of artificial fuel, and it has particular relation to the manufacture of artificial fuel from paper in some desired form, such as logs or briquets.

Heretofore, it has been customary to manufacture artificial fuel in the form of logs or briquets from refuse wood, shavings, sawdust, coal dust, floor sweepings, vegetable matter and the like, but to our knowledge it has never been found feasible or desirable to make such fuel from paper; and especially waste paper, which, in normal times, is relatively cheap and plentiful.

One of the objects of the present invention is to provide an artificial fuel, made from waste paper in the form of logs or briquets, that will have substantially the physical properties, burning qualities and heating value of wood fire logs.

Another object of the invention is the provision of a simple, inexpensive and durable fire log or briquet made from waste paper that will retain its form under varying atmospheric conditions, and which will have the outward appearance and characteristics of fireplace wood.

A further object of the invention is to provide an artificial fuel made from waste paper that is substantially vermin proof, clean and sanitary at all times.

Another object of the invention is the provision of artificial fuel from waste paper that will burn completely and have substantially the rate of combustion of wood fireplace logs, but, while burning, retains its shape, thereby making a minimum amount of flue ash.

Another object of the invention is to provide artificial fuel made from paper in the form of logs or briquets having radial or transverse fissures throughout simulating irregularities of wood and facilitating combustion.

A further object of the invention is to provide an artificial fuel from waste paper in the form of fireplace logs or briquets, which are simple and cheap to manufacture, and easy and convenient to handle and store.

Another object of the invention is the provision of an artificial fuel in the form of a log or briquet having a surface embellishment simulating the appearance and color of natural wood.

Another object of the invention is to provide an artificial fuel made from waste paper which will burn with an orange flame similar to that produced by burning driftwood.

A further object of the invention is the provision of an artificial fuel made from waste paper which will burn with a crackling noise like natural wood logs, but will not throw off sparks or burning embers such as are thrown off by burning natural wood logs.

Other and further objects and advantages of the invention reside in the details of construction of the artificial fuel, which result in simplicity, economy and efficiency, and which will be apparent from the following description, wherein one embodiment of the invention is shown, reference being had to the accompanying drawings, forming a part thereof, wherein like numerals indicate like parts, in which:

Figure 1 is a diagrammatic view of one form of apparatus that may be employed in carrying out the manufacture of artificial fuel from paper in the form of logs or briquets;

Figure 2 is a diagrammatic view of a coating tank, showing one method of immersing the artificial logs to provide a surface coating of a material that is impervious to moisture;

Figure 3 is a perspective view on a slightly larger scale, of an artificial fuel made into the form of a log embodying the principles of the invention; and Figure 4 is a perspective view, on even a larger scale, of a small quantity of the ground or nodulated paper as it appears at the time it is ready to be combined with a binding agent for pressing into the desired shape of logs or briquets.

Claims to the method illustrated in this application form the subject-matter of a co-pending application, which is being filed on even date herewith under Serial No. 666,052.

Waste papers collected from offices, factories, stores and the like consist of many different kinds and grades of paper. Such waste papers may be divided generally into three classes, to-wit: (1) non-absorbent paper, (2) absorbent paper and (3) semi-absorbent paper.

Non-absorbent paper is known generally as a paper consisting of cellulose and sizing such as resin, partially saponified resin, clay, kaolin, silicates, synthetic plastics and the like materials. Such papers are practically impermeable or at best semi-permeable to water, water soluble silicates, concentrated sulphite liquors, solutions of natural or synthetic resins (rosin) in mineral, vegetable or essential oils. All such papers may be described aptly as "non-absorbent" papers, and will hereinafter for the purpose of this invention be so referred to in the specification and claims.

Absorbent paper consists of newsprint, cardboard, box-board and the like. Absorbent paper, unlike non-absorbent paper, contains little or no sizing and is highly absorbent to liquids. For the purpose of this invention, all such papers will be referred to hereinafter as "absorbent" papers.

Between the "absorbent" and "non-absorbent" papers, there is a distinct class of paper that is made up of a mixture of sized and unsized pulps and papers. This type of paper is partially absorbent to liquids, and will hereinafter for convenience be referred to in this application as "semi-absorbent" paper.

When the various kinds of waste papers are collected, they are, in the normal course of handling or processing, sorted or graded into at least the above three named classes. While it is possible to manufacture artificial fuel logs entirely from any one class of paper, it has been found more desirable and practical to use a mixture of the three kinds of paper in the making of such artificial fuel, and a preferable mixture has been found to consist of approximately seventy percent non-absorbent paper, fifteen percent absorbent paper and fifteen percent semi-absorbent paper. Experiments have shown that this ratio produces the best logs or briquets, and it is easily the most desirable since the average collection of mixed waste papers has approximately these proportions of each therein, which means that substantially all of the waste paper gathered in a normal collection may be used advantageously in the making of our artificial fuel.

The sheets or pieces of waste paper are first placed in a hopper 10, which feeds by gravity into a conventional paper grinder or nodulator 12, which grinds and more importantly tears the sheets or pieces of waste paper into relatively small nodules. It has been found that straight cut pieces of waste paper do not produce satisfactory artificial fuel. Straight cut pieces of paper do not lend themselves to a proper mixture with the binding agent, are difficult to compress and in the step of compressing tend to form wads or layers, which give undesirable physical properties and burning qualities. The sizing on the non-absorbent papers does not permit the binder to soak sufficiently into the paper to bind the various pieces together. In the grinding or nodulating of the waste papers, the individual papers are not only ground into small particles, but they are also torn, stretched and rubbed over and over again until a majority of the sizing materials are freed in the form of relatively fine particles and dust. The ground or nodulated paper particles and dust 14 are removed from the nodulator 12, which contains a removable screen of the desired size, onto a conveyor belt 18. The size mesh of the screen in the nodulator 12 controls the ultimate size of the paper nodules passing onto the conveyor 18. While ground or nodulated sizes up to that which will pass through a one-half inch mesh screen can be used satisfactorily in the making of marketable fire logs or briquets, it has been found by actual experience that smaller sizes produce a much more desirable fuel. A compound mixture of three-sixteenths, one-fourth and five-sixteenths has been found to be desirable, but if the paper is ground or reduced to a size such that all of the particles will pass through a screen of one-half inch mesh, while having approximately fifty percent of its total weight made up of particles that will not pass through a quarter inch mesh screen, a very satisfactory log or briquet can be produced.

Before the ground or nodulated paper 14 (see Fig. 4) can be molded, by some form of mechanical action, into the desired shape for sale as fireplace logs or briquets, a suitable binder must be added, such as a water solution of sodium silicate, concentrated sulphite liquor, an emulsified solution of natural or artificial resin (rosin), pitch and asphaltum dissolved in mineral or tar oils, turpentine, tar or tar oils, soap, pulp of vegetable fibre and finely divided inert mineral material. All of these constituents are mixed vigorously in a cold or warm state not over ninety degrees centigrade in order to form an emulsion, suspension and/or dispersion.

It has been found that artificial fireplace logs or briquets made from such waste papers can be produced to simulate different types of wood. For logs or briquets having the burning qualities of hard wood, such as oak, a concentrated sulphite liquor with the addition of a small amount of an emulsion (approximately ten percent) makes a suitable binder; for logs having the burning qualities of semi-hard wood, such as birch, a mixture of about equal parts of concentrated sulphite liquor and an emulsion should be used; and for resinous soft wood, such as southern pine, straight emulsified binder should be used.

These binders are combined with all of the finely nodulated particles until all particles of paper are coated intimately with the binding solution. The mixture at the time of molding or compressing should contain between five to twenty percent moisture.

In the illustration shown in the drawing, the conveyor 18 transports the ground or nodulated material to a conventional mixer 20, into which the binder is delivered through a pipe 22. The quantity of binder is controlled by means of a valve 24. When the binding agent and nodulated particles have been mixed intimately, the admixture may be withdrawn from the mixer 20 through a discharge gate 26 directly into suitable hollow molds 28. The hollow molds 28 should be of a suitable separable construction, which will permit ready separation for removal of the compressed contents immediately after the pressure is removed.

One method of compressing the material in the hollow mold 28 is by means of a conventional hydraulic ram 30, which forces the material into a compact mass against the bottom of the mold 28. The mold 28 may be provided with any suitable internal surface ornamentation, such as one which will reproduce a surface ornamentation simulating the bark or outer surface of a piece of fire wood. The compressing force required will depend somewhat on the desired density of the finished product, the size and type of log to be made, the amount of moisture in the admixture, the kind of binder, the temperatures of the various constituents, the kind of paper, etc. These factors are all so variable that no accurate table of pressures may be given as an exact guide herein. The compressing may be accomplished at normal atmospheric temperatures, and, as soon as the full pressure has been applied, the pressure may be released and the mold 28 removed from its compacted mass 32, which will now retain the shape of the hollow cavity. The compacted mass 32 will be found to be form-retaining, but slightly soft at its surface for a period of from ten to fifteen minutes or until the surface binding material has dried. During this period of time, if the molds 28 have not been provided with a suitable internal surface ornamentation, the logs or briquets may be embellished with an ornamental surface design to simulate the outward appearance of wood by passing them through a conventional roll press (not shown) having pockets provided with a desirable die design. When the surface binding has become dry, the logs or briquets will have a hard and non-sticky surface, and may thereafter be handled normally without danger of breaking.

Another method of providing the compressed logs or briquets with a desirable surface design, which not only enhances the appearance, but also improves the burning qualities of the same, is to form or compress the logs or briquets under pressure that is not constant or continuous, i. e., by alternately partially filling the mold and compressing, then adding more material to the mold and compressing again, repeating the cycle until the mold has been filled and compressed to form a log of the desired size. This non-continuous method forms radial or transversely extending fissures 40 in the finished log or briquet. These fissures, cracks or splits 40 are open on the surface and extend inwardly of the compressed mass. The fissures 40 fill with air which facilitates combustion of the material immediately surrounding, thereby greatly improving the burning qualities of the logs or briquets 42 over one having a relatively smooth and solid outer surface.

It will be found necessary or desirable to give the logs or briquets 42 a coating of material that is not only combustible but also impervious to various kinds of moisture, such as that caused by sweating, dampness, rain, etc. For waterproofing, a solution of resin (rosin) and mineral oil in the proportion of four to one has been found quite satisfactory. In Figure 2, the molded log or briquet is shown being dipped or immersed momentarily while being manipulated by means of a pair of tongs 34 into a coating solution 36 contained in a coating tank 38, which should be provided with facilities (not shown) for maintaining the contents thereof at a desirable temperature. In the case of the resin and mineral oil solution above-mentioned, we have found that a temperature of about eighty degrees centigrade is desirable. The logs or briquets 42 (see Fig. 3) upon removal from the coating solution 36 (see Fig. 2) are allowed to drain to remove the excess of the coating solution. They are then permitted to cool and dry at ordinary room temperatures, after which they will be ready for wrapping, packing, storing or use.

If a particular color is desired to be imparted to the finished logs or briquets, one method of applying it would be to include a desirable coloring pigment in the coating solution 36. Another method would be to include the desired coloring pigment in the binding agent. Of course, by using colored paper of the desired shade, a desirable color could be imparted to the finished logs or briquets, but this is not always practical since mixed waste papers are generally a variety of colors, the predominant colors being white, gray and brown. Obviously, the dipping of logs or briquets into the coating or coloring material can be replaced by spraying.

In the manufacture of fire logs or briquets having the burning qualities of hard woods, we have found that a binding agent consisting of a fifty percent concentrated solution of sulphite liquor is suitable. This concentrated sulphite liquor may be further diluted with water to make a thirty-three and one-third percent solution. To the concentrated sulphite liquor may be added five to ten percent of emulsified binder. By mixing two hundred pounds of nodulated mixed paper passing through a screen of five-sixteenth inch mesh with thirty-six pounds of the above-mentioned diluted solution of sulphite liquor, and compressing under a pressure of eighteen hundred pounds per square inch, a fire log or briquet will be produced having a density of between 1.15 and 1.25, and a weight between seventy-four and eighty pounds per cubic foot. Such a log or briquet will have the burning qualities of a hard wood, such as oak.

In the making of logs or briquets having the burning qualities of soft woods, such as pine, an emulsified pulp binder should be used, which may consist of the following materials compounded within the limits hereinbelow indicated:

|  | Percent |
| --- | --- |
| Resin (rosin) | 30 to 60 |
| Mineral oil (straw oil) | 3 to 6 |
| Sulphite liquor 33⅓% solution | 30 to 60 |
| Pulp of vegetable origin | 10 to 40 |

The exact proportions of these constituents depend upon the temperature of the surrounding atmosphere, the amount of moisture in the paper, the relative humidity of the surrounding atmosphere, the types of paper used, etc. These variables are too many to give a definite table for each condition, but we have found that when two hundred pounds of nodulated paper material are mixed at room temperature with a binding agent made in accordance with the above formula, using forty pounds of resin (rosin), ten pounds of mineral oil (straw oil), fifty pounds of a thirty-three and one-third percent solution of concentrated sulphite liquor, and fifteen pounds of pulp of vegetable origin, and molded under pressures between one thousand and eighteen hundred pounds per square inch, a fireplace log or briquet will be formed having a density of 1 to 1.1, with a weight of sixty to sixty-five pounds per cubic foot. Such a log or briquet will have the burning qualities of a soft wood, such as pine.

One novel way of imparting a brown wood color to the surface of such fire logs or briquets without using color pigments is to scorch part of the nodulated paper, which can be accomplished by heating to a temperature of around one hundred eighty to two hundred degrees Fahrenheit. It is, of course, possible to scorch the nodulated particles of paper even after they have been coated with the binder. The scorched paper will cause a brown flecked surface appearance on the logs that simulates to some extent at least the bark of some woods.

The logs or briquets made with diluted sulphite liquor, or an emulsified binder, or by a combination of both, remain soft on the surface for a period of from ten to fifteen minutes, during which a suitable surface design can be embellished thereon before they become hard and dry. They should also be water-proofed, in the same manner previously described for the hard wood logs, to prevent disintegration when stored in a damp place or when sprayed accidentally with water, as by rain or a hose.

If the logs or briquets 42 are to be made entirely from non-absorbent waste papers, there will be an excessive amount of freed sizing in the form of a fine dust in the ground or nodulated paper, and these excess dust particles should be removed before using the paper particles in the fabrication of logs or briquets. Such excess dust may be removed by means of a conventional air flotation process. Only enough dust should be left in the paper mixture to make a saturated emulsified solution with the binding agent to be used.

If the logs or briquets 42 are to be made entirely from semi-absorbent or absorbent papers, there will be a deficiency in the amount of sizing freed during the grinding or nodulating process. In such a case, it will be found advisable to add some finely divided inert mineral matter to increase the surface attraction of the mass to facilitate compressing into the desired forms. This finely divided inert mineral matter may be either some of the excess sizing previously removed from a batch of non-absorbent paper, precipitated calcium carbonate, fuller's earth, talcum, sawdust, coal dust or soot. The surface attraction of such finely divided inert mineral matter materially assists to maintain the unmixable liquid constituents of emulsified binder in emulsion. The amount of finely divided inert mineral matter to be added depends upon the concentration of sulphite liquor, viscosity and temperature.

If a log or briquet is desired that will burn with an orange colored flame, the concentrated sulphite liquor may be diluted with ordinary sea water. However, if fresh water is used, it is advisable to add about three percent dry weight of a chloride, such as, for example, sodium chloride, potassium chloride, or magnesium chloride. Such logs will burn with a rich orange colored flame that is attractive and satisfying to the eye.

If a log or briquet is desired that will also burn with a crackling noise or effect like ordinary fireplace logs, about one percent sulphur and three percent nitrates dry weight should be added. The crackling effect, which is produced without generating dangerous sparks, results from the mixture of sulphur, nitrate and carbon, the latter being formed in the burning of the paper logs or briquets.

The term "paper" wherever used throughout the specification and claims shall be interpreted generically, and shall include old and/or new paper, boxboard and/or pulpboard, and/or combinations thereof, in any and all forms.

Although we have only described several embodiments of our invention, it will be apparent to those skilled in the art that the invention is not so limited, but that various modifications may be made therein without departing from the spirit thereof or from the scope of the appended claims.

What we claim is:

1. As a new article of manufacture, an artificial fuel comprising a mixture of nodulated paper and binder molded into a form retaining state having a density between 1 and 1.25, said nodulated paper consisting of a mixture of approximately fifteen percent "non-absorbent" paper, seventy percent "absorbent" paper and fifteen percent "semi-absorbent" paper ground to various degrees of fineness whereby all of the nodules will pass through a screen of one-half inch mesh with approximately one-half of the nodules being incapable of passing through a screen of one-quarter inch mesh.

2. As a new article of manufacture, an artificial fuel comprising a mixture of nodulated paper, freed sizing and a binder compressed into a form retaining state having a density between 1 and 1.25, said paper consisting of a mixture of approximately fifteen percent "non-absorbent" paper, seventy percent "absorbent" paper and fifteen percent "semi-absorbent" paper ground to various degrees of fineness whereby all of the nodules will pass through a screen of one-half inch mesh with approximately one-half of the nodules being incapable of passing through a screen of one-quarter inch mesh.

3. As a new article of manufacture, an artificial fuel comprising an admixture of nodulated paper, freed sizing and a flame colorant of at least one material of the group consisting of sodium chloride, potassium chloride and magnesium chloride compressed into a form retaining mass having a density between 1 and 1.25, said nodulated paper consisting of an admixture of approximately fifteen percent "non-absorbent" paper, seventy percent "absorbent" paper and fifteen percent "semi-absorbent" paper ground to various degrees of fineness whereby all of the nodules will pass through a screen of one-half inch mesh with approximately one-half of the nodules being incapable of passing through a screen of one-quarter inch mesh.

4. As a new article of manufacture, an artificial fuel comprising an admixture of nodulated paper, freed sizing and a binder compressed into a form retaining log having a series of longitudinally spaced fissures throughout its surface area extending radially inwardly, said nodulated paper consisting of an admixture of approximately fifteen percent "non-absorbent" paper, seventy percent "absorbent" paper and fifteen percent "semi-absorbent" paper ground to various degrees of fineness whereby all of the nodules will pass through a screen of one-half inch mesh with approximately one-half of the nodules being incapable of passing through a screen of one-quarter inch mesh, said log having a density between 1 and 1.25, said fissures extending a substantial distance into said log and having the characteristics of inwardly extending irregular breaks.

5. As a new article of manufacture, an artificial fuel comprising an admixture of nodulated paper consisting of an admixture of approximately fifteen percent "non-absorbent" paper, seventy percent "absorbent" paper and fifteen percent "semi-absorbent" paper ground to various degrees of fineness whereby all of the nodules will pass through a screen of one-half inch mesh with approximately one-half of the nodules being incapable of passing through a screen of one-quarter inch mesh, freed sizing, a binder, and a flame colorant compressed into a form retaining log having a series of spaced irregular surface fissures, said log having a density between 1 and 1.25, said fissures having the characteristics of circumferentially extending inward breaks, and the outer surface of said log having a moisture-proof outer coating over its entire surface area.

RALPH O. WILLIAMS.
VLADIMIR BREDLIK.

REFERENCES CITED

The following references are of record in the file of this patent:

UNITED STATES PATENTS

| Number | Name | Date |
|---|---|---|
| 185,413 | Whitzel | Dec. 19, 1876 |
| 673,654 | Douglass | May 7, 1901 |
| 1,050,535 | Hartung | Jan. 14, 1913 |
| 1,572,629 | Welton | Feb. 9, 1926 |
| 1,625,133 | Mohler | Apr. 19, 1927 |
| 1,926,578 | Brown | Sept. 12, 1933 |
| 1,977,890 | Ohlwiler | Oct. 23, 1934 |